(12) United States Patent
Mangione et al.

(10) Patent No.: US 8,332,901 B2
(45) Date of Patent: Dec. 11, 2012

(54) METHOD, SYSTEM AND APPARATUS FOR ESTABLISHING A PACKET-BASED CONNECTION WITH A DIAL UP MODEM

(75) Inventors: Clayton Joseph Mangione, Osgoode (CA); Frank Siu Hong Chan, Scarborough (CA)

(73) Assignee: BCE Inc., Verdun, Quebec (CA)

( * ) Notice: Subject to any disclaimer, the term of this patent is extended or adjusted under 35 U.S.C. 154(b) by 1888 days.

(21) Appl. No.: 11/312,746

(22) Filed: Dec. 21, 2005

(65) Prior Publication Data

US 2006/0159243 A1    Jul. 20, 2006

(30) Foreign Application Priority Data

Dec. 23, 2004  (CA) .................................... 2490974

(51) Int. Cl.
*H04N 7/173* (2011.01)
*H04N 7/16* (2011.01)
*H04L 12/66* (2006.01)
*H04L 5/16* (2006.01)
*H04B 1/38* (2006.01)

(52) U.S. Cl. ............ 725/111; 725/98; 725/99; 725/100; 725/109; 725/110; 725/131; 725/133; 725/147; 725/148; 725/149; 725/151; 725/153; 370/354; 375/222

(58) Field of Classification Search .............. 725/1–153; 370/351–356; 375/222
See application file for complete search history.

(56) References Cited

U.S. PATENT DOCUMENTS

| | | | | |
|---|---|---|---|---|
| 4,672,602 A | * | 6/1987 | Hargrave et al. | 370/360 |
| 4,751,510 A | * | 6/1988 | de Saint Michel et al. | 375/222 |
| 5,197,067 A | * | 3/1993 | Fujimoto et al. | 370/354 |
| 5,534,913 A | * | 7/1996 | Majeti et al. | 725/114 |
| 5,654,747 A | * | 8/1997 | Ottesen et al. | 725/104 |
| 5,914,756 A | * | 6/1999 | Maeda et al. | 348/563 |
| 6,034,992 A | * | 3/2000 | Miron et al. | 375/222 |
| 6,188,684 B1 | * | 2/2001 | Setoyama et al. | 370/352 |
| 6,430,185 B1 | * | 8/2002 | Kerns et al. | 370/352 |
| 6,442,255 B1 | * | 8/2002 | Pitsch et al. | 379/106.01 |
| 6,453,473 B1 | * | 9/2002 | Watson, Jr. | 725/120 |

(Continued)

FOREIGN PATENT DOCUMENTS

CA    2 185 053 C    4/2002

(Continued)

OTHER PUBLICATIONS

CheapTelephoneBills.com, VOIP Services, voice over IP, voice over, http://www.cheaptelephonebills.com/voiceover.html, 1 page.

(Continued)

*Primary Examiner* — Pankaj Kumar
*Assistant Examiner* — Randy Flynn

(57) ABSTRACT

Apparatus for establishing a packet-based connection between a video display equipment (such as a set-top box) having an analog modem and a remote computer. The translation apparatus receives a connection initiation request from the video display apparatus and responsive to the connection initiation request establishes a modem connection with the video display apparatus. The translation apparatus further receives communication data from the video display apparatus via the modem connection and transmits the communication data to the remote computing apparatus via a packet-based network. The translation apparatus can also receive communication data from the remote computer and relay the same to the video display apparatus. The connection can be established upon powering up of the video display apparatus, upon loading of an Interactive TV application or upon other pre-determined event. The connection can be maintained "always-on" or substantially "always-on".

52 Claims, 7 Drawing Sheets

U.S. PATENT DOCUMENTS

| | | | | |
|---|---|---|---|---|
| 7,295,600 | B2* | 11/2007 | Noma et al. | 375/222 |
| 2001/0043589 | A1* | 11/2001 | Kikinis | 370/352 |
| 2002/0042925 | A1* | 4/2002 | Ebisu et al. | 725/151 |
| 2002/0052197 | A1* | 5/2002 | Yuen | 455/420 |
| 2002/0062485 | A1* | 5/2002 | Okano et al. | 725/111 |
| 2002/0162115 | A1* | 10/2002 | Bruckner et al. | 725/105 |
| 2002/0162116 | A1* | 10/2002 | Read et al. | 725/106 |
| 2003/0033601 | A1* | 2/2003 | Sakata et al. | 725/31 |
| 2004/0021894 | A1 | 2/2004 | Mundra | |
| 2005/0155082 | A1* | 7/2005 | Weinstein et al. | 725/131 |
| 2006/0120309 | A1* | 6/2006 | Bigras et al. | 370/310 |

FOREIGN PATENT DOCUMENTS

| | | |
|---|---|---|
| EP | 1 011 278 A3 | 8/2000 |
| WO | WO 97/50249 | 12/1997 |
| WO | WO 00/67444 A3 | 11/2000 |
| WO | WO 01/65786 A1 | 9/2001 |

OTHER PUBLICATIONS

Precidia Technologies Inc., EtherDial, IP connectivity solution for dial terminals, http://www.precidia.com/products/etherdial.html, Copyright 2005, 2 pages.

ACKSYS Communications & Systems, Cometh Quick Start Guide, www.acksys.fr, Copyright 2003, 1 page.

RS232 Serial Link—Pin Functions, http://eintr.net/serial/pins_meanings.html, Copyright 2002 Hugo Villeneuve, 3 pages.

rediff.com India Limited, Cable TV to cost more, post-CAS, http://www.rediff.com/money/2003/may/19spec1.htm, Copyright 2005, 9 pages.

Laurie Nichol, Article Insider—Direct TV Satellite Advantages, http://www.articleinsider.com/article/6317, Copyright 2002-2006, 2 pages.

Karim Nice et al., HowStuffWorks, Inc., "How Satellite TV Works", http://electronics.howstuffworks.com/satellite-tv.htm/printable, Copyright 1998-2006, 10 pages.

DISH Network—Technology—Receivers—Standard Receivers, http://www.dishnetwork.com/content/products/receivers/standard/index.shtml, Copyright 2006, 2 pages.

Dish Network—Technology—Receivers—DVR Receivers, http://www.dishnetwork.com/content/products/receivers/dvr/index.shtml, Copyright 2006, 2 pages.

http://www.askey.com/eportal/globalweb/browseCatDispatcher.jsp?catOid=-96&menuCatOid=-91, Askey Computer Corporation, Products, Set-Top-Box, Copyright 2003, 1 page.

* cited by examiner

METHOD, SYSTEM AND APPARATUS FOR ESTABLISHING A PACKET-BASED CONNECTION WITH A DIAL UP MODEM

FIELD OF THE INVENTION

This invention relates generally to communication networks and more specifically to a method, system and apparatus for establishing a packet-based connection with a dial-up modem.

BACKGROUND OF THE INVENTION

Set-top boxes used in direct broadcast satellite (DBS) systems are designed to provide broadcasting of multiple television channels to service subscribers within the footprint of the DBS satellite transponder coverage. DBS systems typically provide only a one way high bandwidth delivery system and do not provide for a return path via the satellite to the DBS service provider. The need to establish the return path between the set-top box and the DBS server has been recognized.

One solution is to provide a dial up modem to enable the set-up box to establish a dial up connection with the DBS service provider via a Public Switched Telephone Network (PSTN). For example, a set-top box provided by EchoStar of 9601 South Meridian Blvd., Englewood, Colo. 80112 USA comprises a 2400 baud dial-up modem.

There are, however, several downsides associated with this approach. Firstly, the set-top box having a dial up modem requires a connection to the PSTN. Traditionally, this is done by connecting the set-top box to a PSTN wall jack (usually in the form of an RJ11 phone jack) within the subscribers' premises, which requires relative proximity of the set-top box to an RJ11 jack or extensive extension cables that may be considered a nuisance by some subscribers. Another more critical problem arises from the very nature of the dial-up modems—in order to connect to the server, the modem within the set-top box needs to dial out to one of the modems coupled to the server and, therefore, occupy the telephone line. If someone in the subscriber's household is using the phone for some other reason (ex. voice conversation, other data connection through another dial-up modem or the like) the set-top box is not able to establish the connection with the server.

There is another problem with using a dial-up modem to establish a connection with the server from the DBS service provider perspective. Namely, for certain activities, such as submitting of votes, authorization of pay-per-view movies, authorizing a game download, submitting highest game scores to the server (i.e. events collectively known in the art as "micro-billing events") the user must key in their request for the micro-billing event into their set-top box and the set-top box needs to transmit the request to the server. In general, dial-up modems establish a connection on demand (rather than keeping it always-on or near always-on, due in part to the requirement to occupy the subscriber's telephone line and in part due to the requirement of having a sufficiently large modem pool on the server side) and may take up to a minute to establish a dial up session with the modem associated with the DBS provider's server. Therefore, there is a certain period of time between the subscriber submitting the request and the set-top box transmitting the request to the DBS server and obtaining a response. Since most of the micro-billing events are based on an impulse decision by the subscriber (commonly referred to as "impulse purchases"), the subscriber may change his/her mind while waiting for the set-top box to establish communication with the DBS server and transmit the request; and cancel the request. This may result in lost sales and, thus, lost revenues for the DBS service provider.

Furthermore, due to security reasons, the modem inside the set-top box is not configured to accept calls; and as such, the DBS service provider is not able to initiate a dial up session, thus limiting the DBS service provider's ability to enhance the service offerings.

Set-top boxes are relatively expensive devices and quite often installation of set-top boxes is subsidised by the DBS providers. It will be appreciated that there are numerous "legacy" set-top boxes (i.e. set-top box having a dial-up model) installed in subscriber premises. In order to provide a commercially viable solution to enable the "legacy" set-top box to be connected via an IP based connection, it should be economical and cost effective.

SUMMARY OF THE INVENTION

A first broad aspect of the present invention seeks to provide a system for enabling the establishment of a packet-based connection with a remote computing apparatus. The system comprises a video display apparatus operable to generate a connection initiation request, the video display apparatus comprising a modem. The system further comprises a processing apparatus, coupled to the modem and to a packet-based network; the processing apparatus operable to receive the connection initiation request; responsive to the connection initiation request, to establish a modem connection with the video display apparatus. The processing apparatus is further operable to receive at least one data signal from the video display apparatus via the modem connection and to transmit the data signal to the remote computing apparatus via the packet-based network.

In some embodiments of the present invention, the processing apparatus is further operable to receive at least one data signal from the remote computing apparatus and to transmit the at least one data signal to the video display apparatus via the modem connection.

In some embodiments of the present invention, the video display apparatus comprises a set-top box (STB) adapted for the use in a direct broadcast satellite system. In some cases, the connection initiation request is generated upon a power up of the video display apparatus. In other cases, the connection initiation request is generated upon loading of an Interactive TV application. In yet further cases, the connection initiation request is generated upon an occurrence of a pre-determined event.

In some embodiments of the present invention, the connection initiation request comprises at least one DTMF tone representing a connection number.

In some embodiments of the present invention, the processing apparatus is further operable to determine a network identifier associated with the remote computing apparatus based on the connection number.

In some embodiments of the present invention the system further comprises a look-up table for correlation of the connection number with the corresponding network identifier. In some embodiments of the present invention, the at least one data signal comprises at least one of a microbilling event, a submission of a high score, a submission of a vote, a request for authorization for downloading of a pay-per-view movie, a request for a new encryption code, an authentication request for a smart card, a request for a software download, a request for a program download, a request for a firmware download, a random maintenance check request and submission of data representing program statistics.

In some embodiments of the present invention, the video display apparatus comprises a set-top box (STB) adapted for the use in a direct broadcast satellite system. In these embodiments, the system further comprises a service provider uplink facility; a geostationary satellite for receiving a signal feed from the uplink facility and broadcasting the signal feed; and a receiver in communication with the video display apparatus for receiving the signal feed.

A second broad aspect of the present invention seeks to provide a method for establishing a packet-based connection between a video display apparatus and a remote computing apparatus coupled to a packet-based network, the video display apparatus comprising a modem, the method comprising:

receiving a connection initiation request from the video display apparatus;

establishing a modem connection with the modem within the video display apparatus responsive to the connection initiation request;

receiving at least one data signal from at least one of the video display apparatus via the modem connection and the remote computing apparatus via the packet-based network; and transmitting the at least one data signal to the other one of the video display apparatus via the modem connection and the remote computing apparatus via the packet-based network.

In some embodiments, the method further comprises generating the connection initiation request prior to receiving the connection initiation request. In some cases, the generating is performed upon a power up of the video display apparatus. In other cases, the generating is performed upon loading of an Interactive TV application. In yet further cases, the generating is performed upon an occurrence of a pre-determined event.

A third broad aspect of the present invention seeks to provide an apparatus for enabling the establishment of a packet-based connection between a local computing apparatus comprising a modem and a remote computing apparatus coupled to a packet-based network. The apparatus comprises a first interface operable to be coupled to the modem within the local computing apparatus. The apparatus further comprises a second interface operable to be coupled to the packet-based network. The apparatus further comprises a processing apparatus operable to receive a connection initiation request from the local computing apparatus via the first interface and to establish a modem connection with the video display apparatus in response to the connection initiation request. The processing apparatus is further operable to receive at least one data signal from the local computing apparatus via the modem connection and to transmit the data signal to the remote computing apparatus via the packet-based network.

In some embodiments of the present invention, the local computing apparatus comprises a set-top box. In these embodiments, the at least one data signal comprises at least one of a microbilling event, a submission of a high score, a submission of a vote, a request for authorization for downloading of a pay-per-view movie, a request for a new encryption code, an authentication request for a smart card, a request for a software download, a request for a program download, a request for a firmware download, a random maintenance check request and submission of data representing program statistics.

In some embodiments of the present invention, the local computing apparatus comprises a security apparatus. In these embodiments, the at least one data signal comprises at least one of a security breach information, a monitoring data, a request for an authorization code update, a request for an authorization code reset, a request for a software download, a request for a firmware download and a request for an application download.

In further embodiments of the present invention, the local computing apparatus comprises a monitoring apparatus. In these embodiments, the at least one data signal comprises at least one of a power failure information and a network failure information.

In some embodiments of the present invention, the processing apparatus is further operable to receive at least one data signal from the remote computing apparatus and to transmit the at least one data signal via the modem connection to the local computing apparatus.

In some embodiments of the present invention, the connection initiation request comprises a connection number. In some cases, the connection number comprises at least one DTMF tone. The processing apparatus is further operable to determine a network identifier associated with the remote computing apparatus based on the connection number by accessing a look-up table to correlate the connection number and the corresponding network address.

In some embodiments of the present invention, the apparatus is located in close proximity to the local computing apparatus. In some cases, the first interface is adapted to be plugged directly into the local computing apparatus.

In some embodiments of the present invention, the first interface is coupled to the local computing apparatus via a Category 3 Unshielded Twisted Pair cable.

In some embodiments of the present invention, the processing apparatus comprises a relaying apparatus, coupled to the first interface, for enabling initiation of the modem connection; a network communication apparatus, coupled to the first interface, for establishing the modem connection and demodulating the data signal, and a computing apparatus, coupled to the network communication apparatus and the packet-based network, for packetizing the demodulated data signal. In some cases, the relaying apparatus and the computing apparatus are embodied in a single apparatus.

In some embodiments of the present invention, the relaying apparatus is operable to provide a ring tone to the network communication apparatus in response to the connection initiation request. In other embodiments, the relaying apparatus is operable to provide a dial tone to the modem via the first interface and, responsive to the connection initiation request, to provide a ring tone to the network communication apparatus.

Another broad aspect of the present invention seeks to provide a system for enabling the establishment of a packet-based connection with a remote computing apparatus. The system comprises a local computing apparatus operable to generate a connection initiation request, the local computing apparatus comprising a modem; a processing apparatus, coupled to the modem and to a packet-based network; the processing apparatus operable to receive the connection initiation request; responsive to the connection initiation request, to establish a modem connection with the local computing apparatus; the processing apparatus further operable to receive at least one data signal from the local computing apparatus via the modem connection and to transmit the data signal to the remote computing apparatus via the packet-based network.

In some embodiments of the present invention, the local computing apparatus comprises a security apparatus. In some cases, the connection initiation request is generated upon a power up of the security apparatus. In other cases, the connection initiation request is generated upon detection of a security breach by the security apparatus. In these embodiments, the at least one data signal comprises at least one of a security breach information, a monitoring data, a request for an authorization code update, a request for an authorization code reset, a request for a software download, a request for a firmware download and a request for an application download.

In some embodiments of the present invention, the local computing apparatus comprises a monitoring apparatus. In some cases, the connection initiation request is generated upon a power up of the monitoring apparatus. In other cases, the connection initiation request is generated upon a pre-determined event being detected by the monitoring apparatus. In these embodiments, the at least one data signal comprises at least one of a power failure information and a network failure information.

Another broad aspect of the present invention seeks to provide a method for establishing a packet-based connection between a local computing apparatus and a remote computing apparatus coupled to a packet-based network, the local computing apparatus comprising a modem. The method comprises:

receiving a connection initiation request from the local computing apparatus;

establishing a modem connection with the modem within the local computing apparatus responsive to the connection initiation request;

receiving at least one data signal from at least one of the local computing apparatus via the modem connection and the remote computing apparatus via the packet-based network; and transmitting the at least one data signal to the other one of the local computing apparatus via the modem connection and the remote computing apparatus via the packet-based network.

In some embodiments of the present invention, the local computing apparatus comprises a security apparatus. In these embodiments, the receiving at least one data signal comprises receiving at least one of a security breach information, a monitoring data, a request for an authorization code update, a request for an authorization code reset, a request for a software download, a request for a firmware download and a request for an application download.

In some embodiments of the present invention, the method further comprises generating the connection initiation request prior to receiving the connection initiation request. In some cases, the generating is performed upon a power up of the security apparatus. In other cases, the generating is performed upon detection of a security breach by the security apparatus.

In some embodiments of the present invention, the local computing apparatus comprises a monitoring apparatus. In some cases, the method further comprises generating the connection initiation request prior to receiving the connection initiation request. In some cases, the generating is performed upon a power up of the monitoring apparatus. In other cases, the generating is performed upon occurrence of a pre-determined event detected by the monitoring apparatus.

In some embodiments of the present invention, the receiving at least one data signal comprises receiving at least one of a power failure information and a network failure information.

Another broad aspect of the present invention seeks to provide an apparatus for enabling the establishment of a packet-based connection between a video display apparatus comprising a modem and a remote computing apparatus coupled to a packet-based network. The apparatus comprises means for receiving a connection initiation request from the video display apparatus via the first interface and to establish a modem connection with the video display apparatus in response to the connection initiation request; means for receiving at least one data signal from one of the video display apparatus via the modem connection and the remote computing apparatus via the packet-based network; and to transmit the data signal to the other one of the video display apparatus via the modem connection and the remote computing apparatus via the packet-based network.

A further broad aspect of the present invention seeks to provide a computer-readable media storing a plurality of programming instructions for execution on a computing apparatus that is connectable to a video display apparatus via a modem connection and to a remote computer via a packet-based network, said instructions for rendering said computing apparatus to receive a connection initiation request from the video display apparatus via the first interface and to establish a modem connection with the video display apparatus in response to the connection initiation request; the processing apparatus further operable to receive at least one data signal from the video display apparatus via the modem connection and to transmit the data signal to the remote computing apparatus via the packet-based network.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

Embodiments of the present invention are described with reference to the following figures, in which.

DETAILED DESCRIPTION OF EMBODIMENTS

Figure 1:
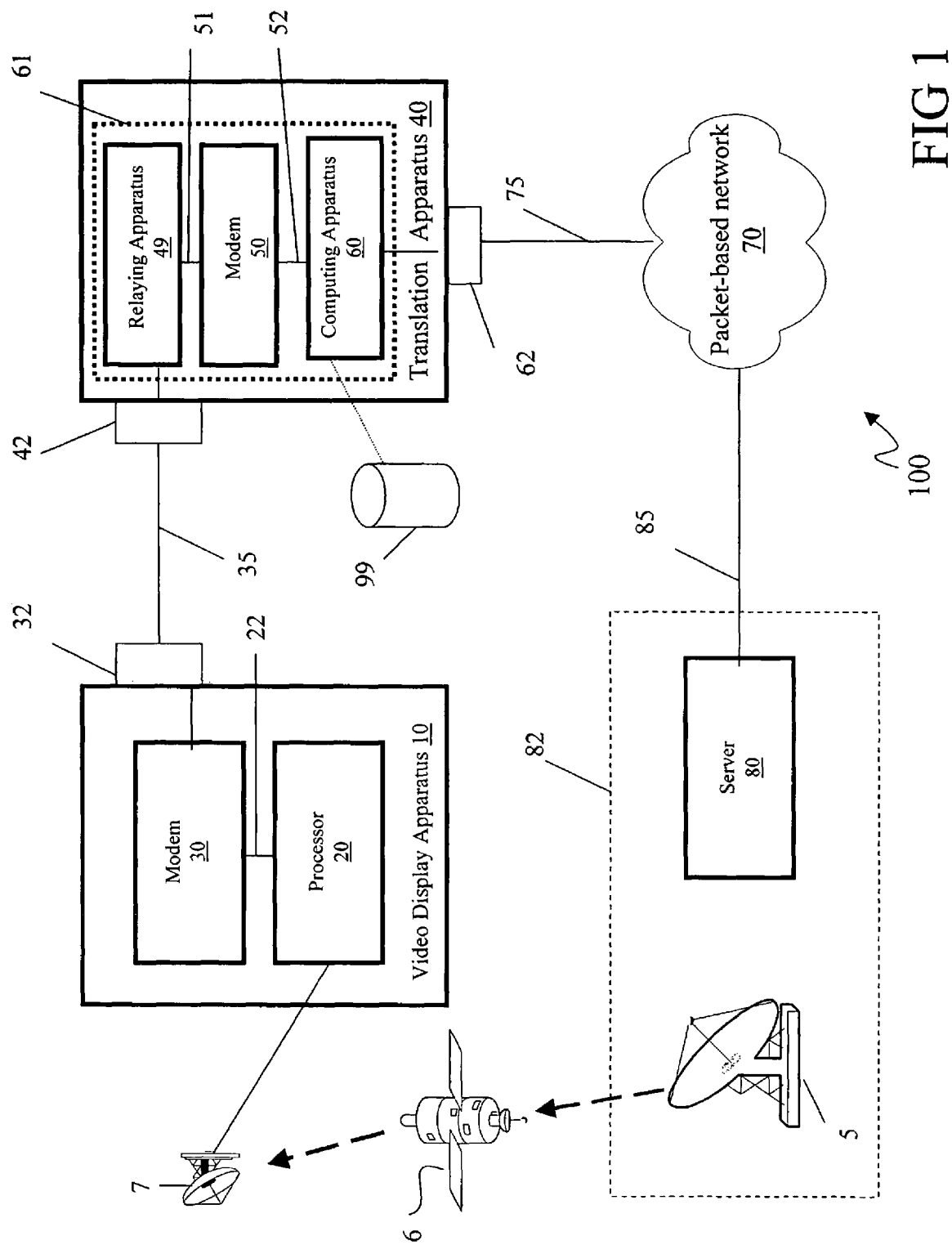
FIG. 1 is a block diagram illustrating a system for packet-based connection establishment according to one embodiment of the present invention.

FIG. 1 depicts a block diagram of a system 100 that can be used to establish a packet-based connection according to an embodiment of the present invention. The system 100 comprises an uplink facility 5 located at the DBS service provider facility which collects a variety of channels from various sources. These are then coded for transmission to a geostationary satellite 6. The geostationary satellite 6 receives the video signal, amplifies it, and broadcasts the video signal over its broadcasting footprint. The high frequency digital broadcast signal is received at a subscriber's residence by means of a small-size receiver dish 7. It should be clear that other types of satellites and uplink facilities can be used without departing from the teachings of this invention.

The system 100 further comprises a video display apparatus 10 coupled to the receiver dish 7 in a manner known in the art. The video display apparatus 10 can be a set-top box specifically adapted for usage in a DBS environment. For example, the video display apparatus 10 can comprise an ExpressVu 3100 receiver set-top box provided by EchoStar. The video display apparatus 10 comprises a processor 20 and a modem 30. One skilled in the art will appreciate, that such a processor 20 can further comprise means for receiving a satellite signal, means for decrypting the received satellite signal and means for translating the decrypted satellite signal for displaying on the subscriber's TV, as well as a number of other components required for receiving, processing, decoding and transmitting the signal to a TV set, all of which are well known in the art. The video display apparatus 10 further comprises an interface 32 adapted to be coupled to a communication link 35. The interface 32 can comprise a well known RJ11 female jack. The interface 32 can also be adapted to be coupled to any serial, parallel or other connection. Other alternatives will be apparent to those skilled in the art having access to the teachings of this invention.

The modem 30 can be a dial up modem, such as a dial up TDM modem utilizing a V.90 standard well known to those skilled in the art. In one specific non-limiting example, the modem 30 can comprises a Zilog 2400, manufactured and distributed by ZiLOG with headquarters in San Jose, Calif., United States of America. One will appreciate, that other types of dial up and other types of analog modems can be used without departing from the teachings of this invention. The modem 30 is coupled to the processor 20 via a communication link 22. The communication link 22 can comprise a serial connection, a parallel connection or the like. In one embodiment of the present invention, the communication link 22 can comprise an RS232 connection. In some embodiments of the present invention, the modem 30 is linked to the processor 20 through an internal link. Other types of connection will be readily apparent to those skilled in the art. For example, the modem 30 can be located externally to the video display apparatus 10.

The system 100 further comprises a translation apparatus 40 coupled to the video display apparatus 10 via the communication link 35. The translation apparatus 40 comprises an interface 42 adapted to be coupled to the communication link 35. The communication link 35 can be an RJ11 cable connection. Alternatively, the communication link 35 can comprise any wireless or other physical layer carrier. In other embodiments of the present invention, the interface 42 of the translation apparatus 40 is adapted to be complimentary to the interface 32, and can be plugged directly with a straight through Category 3 Unshielded Twisted Pair (UTP), known to those skilled in the art, into the interface 32. In this embodiment, the communication link 35 can comprise a direct connection of the translation apparatus 40 into the video display apparatus 10.

The translation apparatus 40 comprises a relaying apparatus 49 coupled to the interface 42. The relaying apparatus 49 comprises a general purpose or specially constructed processor. In some embodiments of the present invention, the relaying apparatus 49 is a purpose-built device that generates a dial tone over the communication link 35. The relaying apparatus 49 can further receive calls over the communication link 35, as will be described in greater detail herein below. The translation apparatus 40 further comprises a modem 50, coupled to the relaying apparatus 49, and a computing apparatus 60 coupled to the modem 50. The modem 50 can be a dial up modem and is complimentary to the modem 30; that is the modem 50 uses the same communication protocols as the modem 30. In some embodiments of the present invention, the modem 50 can be of the same make and model as the modem 30.

In some embodiments of the present invention, the modem 50 and the computing apparatus 60 can be embodied into a single processing apparatus. In other embodiments of the present invention, the relaying apparatus 49 and the computing apparatus 60 can be embodied into a single processing apparatus. In yet further embodiments, the relaying apparatus 49, the computing apparatus 60 and the modem 50 can be all embodied in a single processing apparatus, depicted as 61.

The relaying apparatus 49 is coupled to the modem 50 via a communication link 51. The communication link 51 can comprise a serial connection, a parallel connection, a coaxial cable connection or the like. In some embodiments, the communication link 51 can comprise an RS232 connection.

The computing apparatus 60 is coupled to the modem 50 via a communication link 52. The communication link 52 can comprise a serial connection, a parallel connection or a coaxial cable connection. In some embodiments, the communication link 52 can comprise an RS232 connection. Other types of connection will be readily apparent to those skilled in the art. The computing apparatus 60 comprises a general purpose or specially constructed processor. In some embodiments of the present invention, the computing apparatus 60 is a purpose-built device that receives demodulated signals from the modem 50 and converts them into at least one IP packet. The computing apparatus 40 can have access to a lookup table 99, as will be described in greater detail herein below. The look-up table 99 can be hosted by the computing apparatus 60, by other components of the translation apparatus 40 or can be hosted on an external source, such as a private network or the like.

The translation apparatus 40 further comprises a second interface 62 coupled to the computing apparatus 60. The second interface 62 can comprise an Ethernet connector, a USB connector, a WiFi connector or the like.

The translation apparatus 40 is coupled to a packet-based network 70 via a communication link 75 and the second interface 62. The packet-based network 70 can comprise any IP based network, such as an Internet, an Intranet, a WAN or a LAN. Other alternatives will be apparent to those skilled in the art. The communication link 75 between the translation apparatus 40 and the packet-based network 70 can comprise any type of access link/connection. A person skilled in the art will appreciate that communication link 75 can comprise a number of routers, repeater hubs, DSLAM infrastructures, cable head-end infrastructures, WiFi connection architectures and the like required to route packet(s) to/from the packet-based network 70.

The system 100 further comprises a server 80. The server 80 is typically associated with the DBS service provider and can process requests and other submissions from video display apparatus, as well as provide updates and other maintenance functions to the video display apparatus 10. The server 80 is coupled to the packet-based network 70 via a communication link 85. The communication link 85 between the server 80 and the packet-based network 70 can comprise any type of access link/connection. A person skilled in the art will appreciate that communication link 85 can comprise a number of routers, repeater hubs, DSLAM infrastructures, cable head-end infrastructures, WiFi connection architectures and the like required to route packet(s) to/from the packet-based network 70. In some embodiments, the server 80 is within the same service provider premises 82 as the uplink facility 5. In alternate embodiments, the server 80 and the uplink facility 5 are in distinct locations operated by the same or different companies.

The translation apparatus 40 and the server 80 are each assigned an IP address used for communication over the packet-based network 70. In a specific non-limiting example, the translation apparatus 40 may be assigned a static IP address 55.85.162.01 and the server 80 may be assigned a static IP address 55.85.162.02. Therefore, IP packets from the translation apparatus 40 addressed to the server 80 will contain the IP address associated with the server 80 within the IP packet header (i.e. 55.85.162.02). In the same manner, IP packets from the server 80 addressed to the translation apparatus 40 will contain the IP address associated with the translation apparatus 40 within the IP packet header or payload (i.e. 55.85.162.02). The assignment of IP addresses can be both static and dynamic, as will be explained in greater detail below.

One should understand, that even though only a single video display apparatus 10 and a single translation apparatus 40 have been depicted for simplicity, the system 100 will typically comprise multiple video display apparatuses and multiple translation apparatuses coupled to the packet based network 70. In the same manner, the system can comprise multiple servers 80.

Figure 2:
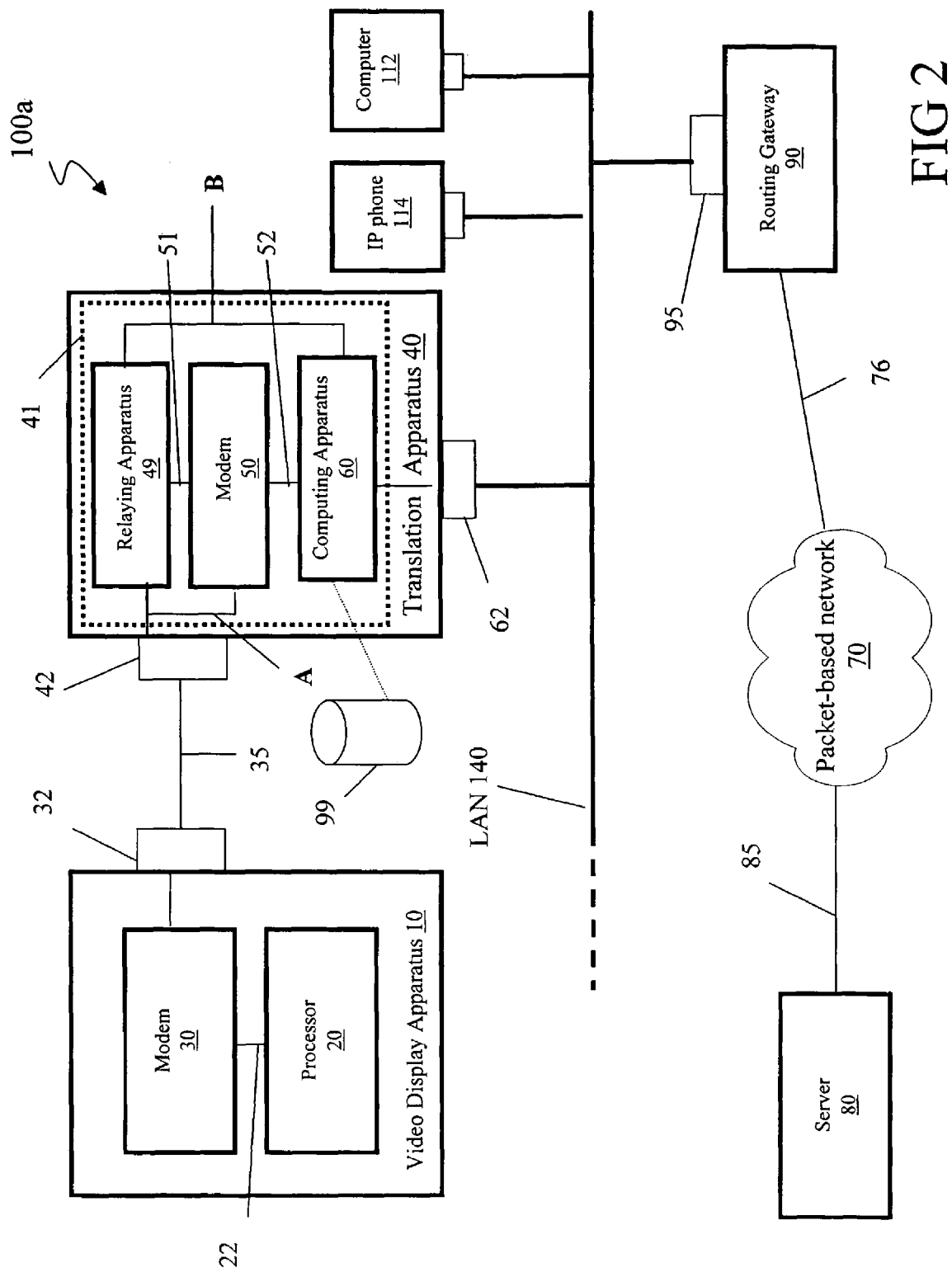
FIG. 2 is a block diagram illustrating the system for packet-based connection establishment according to another embodiment of the present invention.

FIG. 2 depicts a system 100a that can be used to establish a packet-based connection according to another embodiment of the present invention. The system 100a comprises video display apparatus 10 and translation apparatus 40 similar to the system 100. The system 100a can also comprise the uplink facility 5, the geostationary satellite 6 and the receiver dish 7 similar to those depicted in FIG. 1 that have been omitted for simplicity. The system 100a further comprises a routing gateway 90 coupled to the packet-based network 70 and to a Local Area Network (LAN) 140. The LAN 140 can be connected to a number of devices within the subscriber premises, such as the translation apparatus 40 and other subscriber premises equipment, such as a computer 112 and an IP phone 114. In an example embodiment, the routing gateway 90 comprises hardware and software necessary to allow the in-home devices to communicate with the packet-based network 70. For instance, the routing gateway 90 may act as an Ethernet switch for the various in-home devices. In another example, the routing gateway 90 may comprise an interface 95 adapted to have wireless capabilities, e.g., in accordance with IEEE standards 802.11a, 802.11b, 802.11g, etc. Additionally, as will be described in further detail later on, the routing gateway 90 communicates with the server 80 via the packet-based network 70, and provides routing functionality between these components and the in-home devices, in particular the translation apparatus 40 which is connected to the video display apparatus 10.

In some embodiments of the present invention, the translation apparatus 40 and the routing gateway 90 can be embodied in a single apparatus.

The second interface 62 can be adapted to communicate according to a protocol commonly known as WiFi (Wireless Fidelity) or 802.11G, defined by the IEEE (Institute of Electrical and Electronics Engineers). The second interface 62 can also be adapted to communication using other 802.11x standards, cellular or other wireless standards. It should be apparent, that communication standards used by the second interface 62 and the interface 95 are complimentary to each other.

In some embodiments of the present invention, the translation apparatus 40 is located in close proximity with the video display apparatus 10. The routing gateway 90 can comprise a DSL modem, a cable modem or the like, which is adapted to connect to the packet-based network 70 using the telephone line terminating at the subscriber's premises via the well-known RJ11 jack. The routing gateway 90, therefore, can be located in close proximity to the RJ11 jack. The LAN 140 can be a wireless LAN and communication between devices connected to the LAN (such as translation apparatus 40 and routing gateway 90) can be conducted according to an 802.11x protocol or another wireless standard. In this specific non-limiting example, the video display apparatus 10 can access the server 80 via the translation apparatus 40 and the routing gateway 90 as will be described in greater details herein below without the need for the video display apparatus 10 to be in direct proximity to the RJ11 jack or extensive extension cabling.

The functionality of the routing gateway 90 will now be described in greater detail. Because the LAN 140 is not visible to entities outside the LAN 140 in this embodiment, a process called network address translation (NAT) needs to be performed to ensure that return packets can be properly routed within the LAN 140 when received from server 80 or another originating point within the packet-based network 70.

The translation apparatus 40 can be assigned address 192.100.1.101, computer 112 can be assigned address 192.100.1.102 and IP phone 114 can be assigned address 192.100.1.103. In addition, also for the purposes of communication within the LAN 140, the routing gateway 90 may be assigned address 192.100.1.1. The assigning of addresses typically occurs upon creation of the LAN 140 and as new devices are added to the LAN 140. It is apparent that any of the in-home devices connected to the LAN 140 can communicate with any of the other in-home devices, or with the routing gateway 90, by simply directing IP packets to the corresponding address.

In addition, the routing gateway 90 communicates with the "outside world" (relative to the video display apparatus 10), in this case with the server 80. Again, if an IP-based protocol is to be used for communication, there will be an IP address assigned to each of these entities, for the purposes of communicating with each other. For example, the routing gateway 90 may be assigned address 65.95.162.01 and the server 80 may be assigned address 65.95.1152.1. The assigning of addresses typically occurs on a case-by-case basis, as new devices are added to the outside world. One should understand, that the assignment of IP address can be both static and dynamic. For example, the routing gateway 90 can be assigned a dynamic IP address and such an assigned dynamic IP address will be updated in the respective routing table maintained by network routers within packet-based network 70. Furthermore, server 80 can be assigned a dynamic IP address. As will be appreciated by those skilled in the art, in these embodiments, the translation apparatus 40 and/or the routing gateway 90 can be pre-programmed or have access to the Domain Name (DN) of the server 80 which is then translated to the IP address associated with the server 80. The translation of DN into IP addresses is well known to those of skill in the art.

Figure 3:
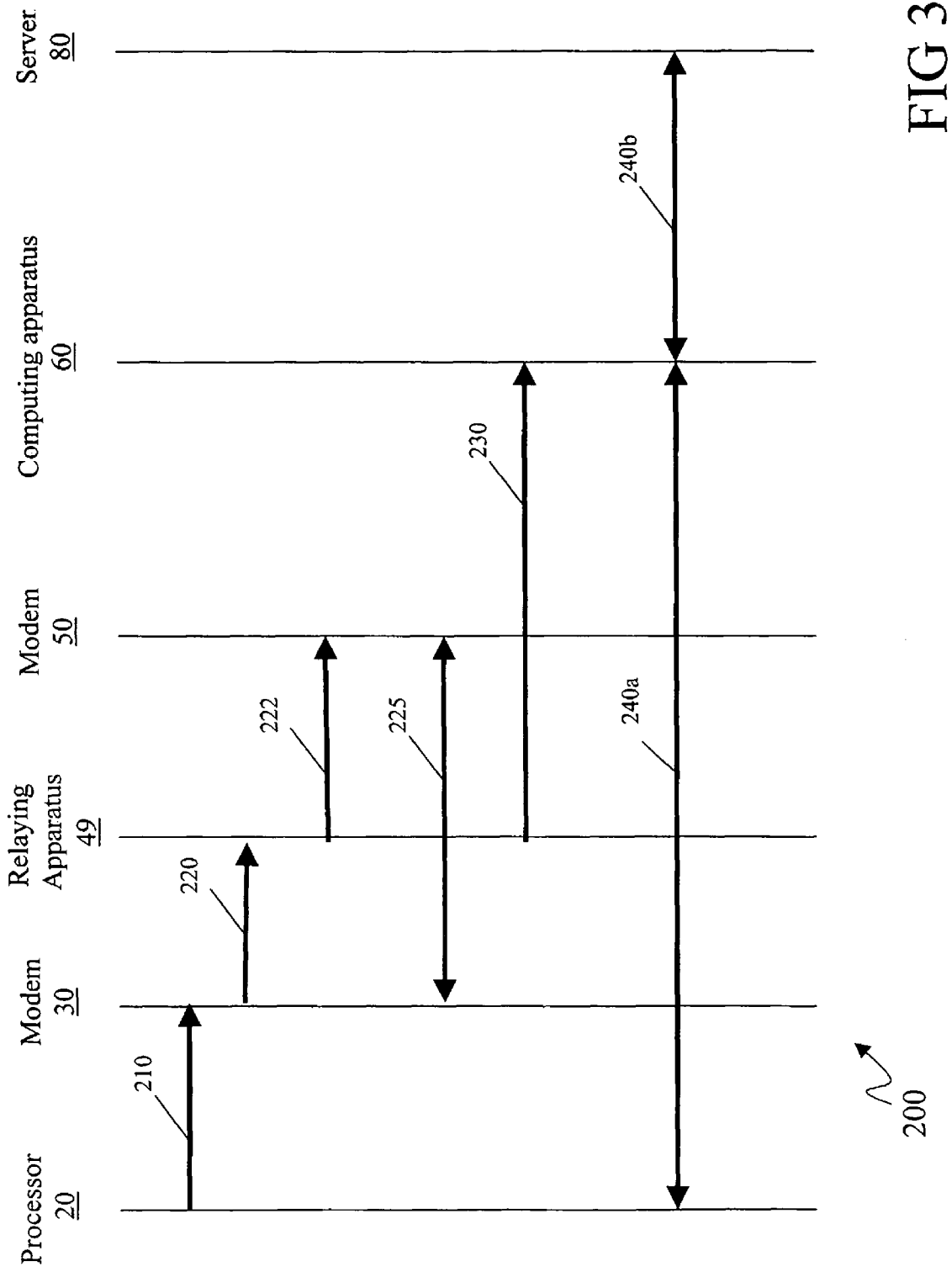
FIG. 3 is a flow chart illustrating the flow of messages within the system for connection establishment depicted in FIG. 2 for initiating a packet-based connection according to an embodiment of the present invention.

A method of packet-based connection establishment 200 according to one embodiment of the present invention will now be described in greater detail with reference to FIG. 3. In order to assist in the explanation of the method, it will be assumed that method 200 is operated using the system 100a of FIG. 2. Furthermore, the following discussion of method 200 will lead to further understanding of system 100a and its various components. It should be understood that the steps in method 200 need not be performed in the sequence shown. Further, it is to be understood that system 100a and/or method 200 can be varied, and need not work as discussed herein in conjunction with each other, and that such variations are within the scope of the present invention.

The method of connection establishment 200 starts at step 210, wherein the processor 20 generates a connection initiation request. The step 210 can be performed upon the video display apparatus 10 being turned on (i.e. during the initiation of the video display apparatus 10). Alternatively, step 210 can be performed upon the subscriber loading an Interactive TV application. Step 210 can also be performed "on-demand", for example upon a user entering a request at the video display apparatus 10. Step 210 can also be performed at pre-determined, pre-programmed or random time intervals. Step 210 can also be triggered by certain programming of the processor 20, such as submission of previously entered votes, a request to submit data representing program statistics, a request for new encryption codes, a random maintenance check, a request for software updates or the like. Alternatively, the programming of the processor 20 can trigger step 210 upon a certain event, such as the removal of a smart card from the video display apparatus 10 or the like. The processor 20 transmits the connection initiation request to the modem 30 via the communication link 22.

The modem 30 monitors the communication link 22 for a connection initiation request and upon the receipt of the request from the processor 20, the modem 30 proceeds to step 220.

In step 220, the modem 30 triggers communications with the modem 50 via the relaying apparatus 49 of the translation apparatus 40. The relaying apparatus 50 can have the capability to provide a dial tone via the communication link 22. In one specific non-limiting example, the modem 30 detects the dial tone over the communication link 22 and, responsive to the dial tone, generates a DTMF tone representing a connection number. The connection number can take various formats, such as a single digit number or various combinations of multiple digits, such as 30211133, 416-333-4444, 1-800-111-2222 or 123. In some embodiments, the connection number is a telephone number, a toll-free number or a MAC address. It should be apparent that any number associated with the modem 50 can be used to trigger communication between the modem 30 and the modem 50. In some embodiments of the present invention, the modem 50 can start generating the DTMF tone without first detecting the dial tone over the communication link 22. In these embodiments, the modem 30 can dial out to the modem 50 without the need for the relaying apparatus 49.

The relaying apparatus 49 detects the incoming call from the modem 30 via the communication link 35 by detecting the DTMF tones transmitted. The relaying apparatus 49 answers the incoming call and, in some embodiments of the present invention, captures the connection number that was used to initiate the call.

In step 222 the relaying apparatus 49 then switches the call to the modem 50. In some embodiments of the present invention, the relaying apparatus 49 generates a ring signal, such as a ring tone, to initiate the call with the modem 50. In response to the ring signal, the modem 50 initiates a procedure commonly known as a "handshake" with the modem 30 (depicted as step 225 on FIG. 3). If the handshake procedure is successful, a two-way communication is established between modem 30 and modem 50 as depicted at step 225.

If step 225 has not successfully executed (for example, the modem 30 and the modem 50 were not able to complete the handshake procedure), the method 200 may retry step 220 after a pre-determined period of time, such as after 60 seconds.

Figure 4:
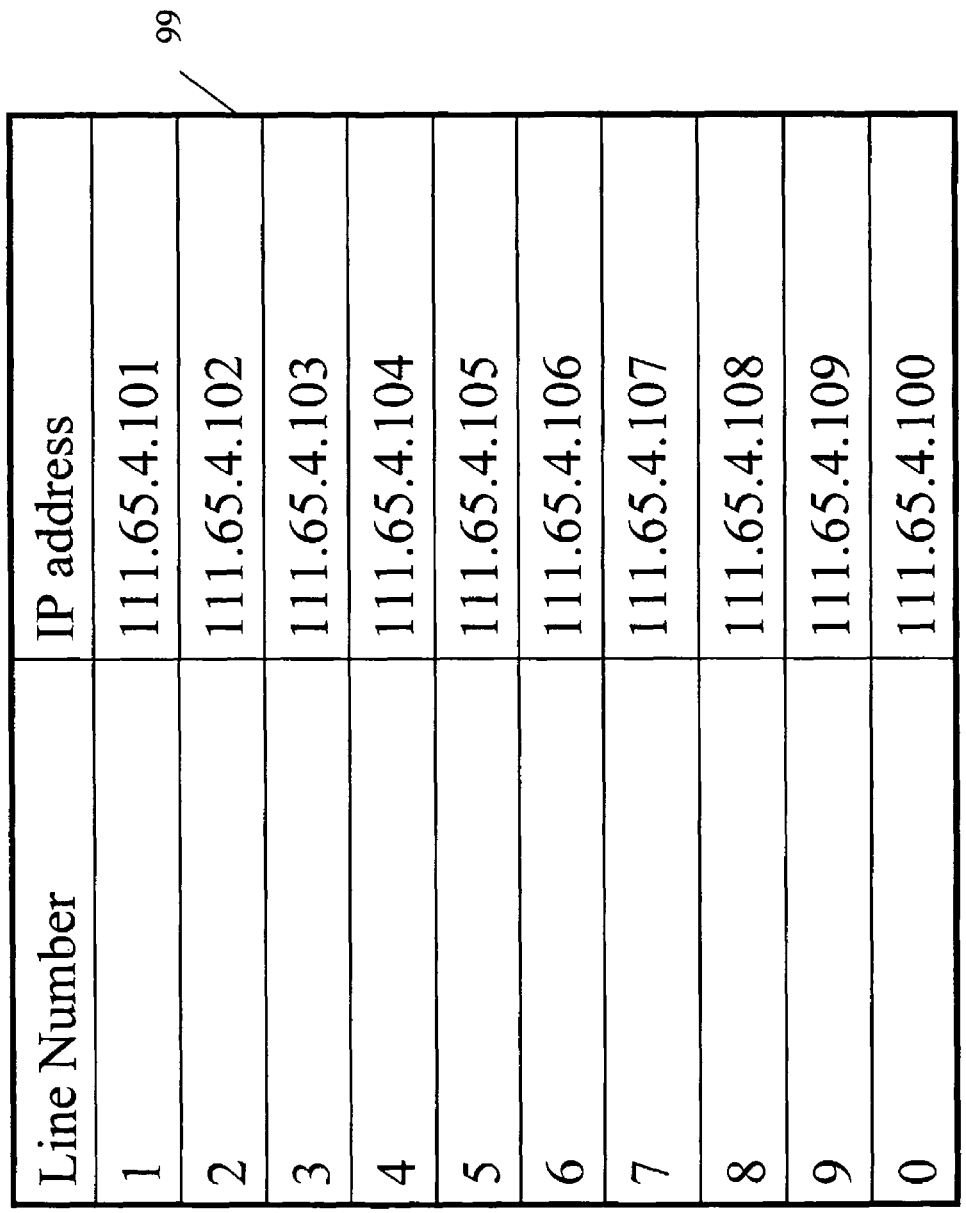
FIG. 4 is a chart representing a look-up table according to an embodiment of the present invention.

Upon successful completion of step 225, the method 200 proceeds to step 230. In step 230, the computing apparatus 60 determines the destination address for the communication data originated from the video display apparatus 10. In one specific non-limiting example, the computing apparatus 60 determines an IP address associated with the server 80. In alternative embodiments, the computing apparatus 60 can determine a Domain Name (DN) or URL associated with the server 80. The computing apparatus 60 can have access to a look-up table 99. A reference is now made to FIG. 4, which depicts the look-up table 99 according to one embodiment of the present invention. As depicted, the look-up table 99 can comprise two columns—one comprising connection numbers and one comprising corresponding IP addresses, DNs or URLs. For example, the connection number 1 corresponds to an IP address 111.65.4.101, and the connection number 2 corresponds to an IP address 111.65.4.102. In other embodiments, the look-up table 99 can comprise a single entry. Alternatively, no matter what the connection number sent, a single IP address, DN or URL associated with the server 80 could be known by the computing apparatus 60. In this case, the computing apparatus 60 would not have to look-up the corresponding IP address, DN or URL; no look-up table 99 would be necessary; and potentially, no communication between the relaying apparatus 49 and the computing apparatus 60 may be necessary. In yet another embodiment, the IP address, DN or URL associated with the server 80 can be provided to the modem 50 in step 220 as part of the initiation request.

The reference is once again made to FIG. 3. In step 230 the computing apparatus 60 receives the connection number from the relaying apparatus 49 that was used to establish the two-way communication between the modem 30 and the relaying apparatus 49. In one specific non-limiting example, the relaying apparatus 49 transmits the captured connection number to the computing apparatus 60 through the link marked as B on FIG. 2, thus by-passing the modem 50. Alternatively, the relaying apparatus 49 can transmit the connection number via the modem 50 and communication links 51, 52. As described above, based on the received connection number, the computing apparatus 60 determines the destination IP address, DN or URL.

As will be explained in greater detail herein below, modulated communication data generated by the video display apparatus 10 can be received by the translation apparatus 40, be demodulated and packetized into at least one IP packet and transmitted to the server 80 via the packet-based network 70. In the same manner, the server 80 can transmit communication data to the translation apparatus 40, which receives IP packet(s), de-packetizes the received IP packet(s), modulates the communication data and transmits it to the video display apparatus 10.

Effectively, a two-way communication session has been established between the video display apparatus 10 and server 80 via the packet-based network 70, which is depicted as a composite of signal 240a and signal 240b. As depicted, signal 240a comprises a communication session between the processor 20 and the computing apparatus 60 via the modem 30, modem 50 and, in some embodiments, via the relaying apparatus 49. Signals 240b comprises a communication session between the computing apparatus 60 and the server 80 via the packet-based network 70. One should understand that the two-way communication session between the video display apparatus 10 and the translation apparatus 40 can be maintained "always-on" or substantially "always-on", so that communication data can be transmitted between the video display apparatus 10 and the server 80, without the need to establish the two-way communication session every time. In alternative embodiments, the two-way communication session between the video-display apparatus 10 and the translation apparatus 40 can be disengaged after a certain period of time or upon transmission of data, as the need may be. Furthermore, if there is a need to maintain the two-way communication session between the video display apparatus 10 and the translation apparatus 40 in an "always-on" or a substantially "always-on" manner, it should be understood that this can be done little or no impact on the subscriber's telephone line, PSTN or the usage/capacity of the packet-based network 70.

Figure 5:
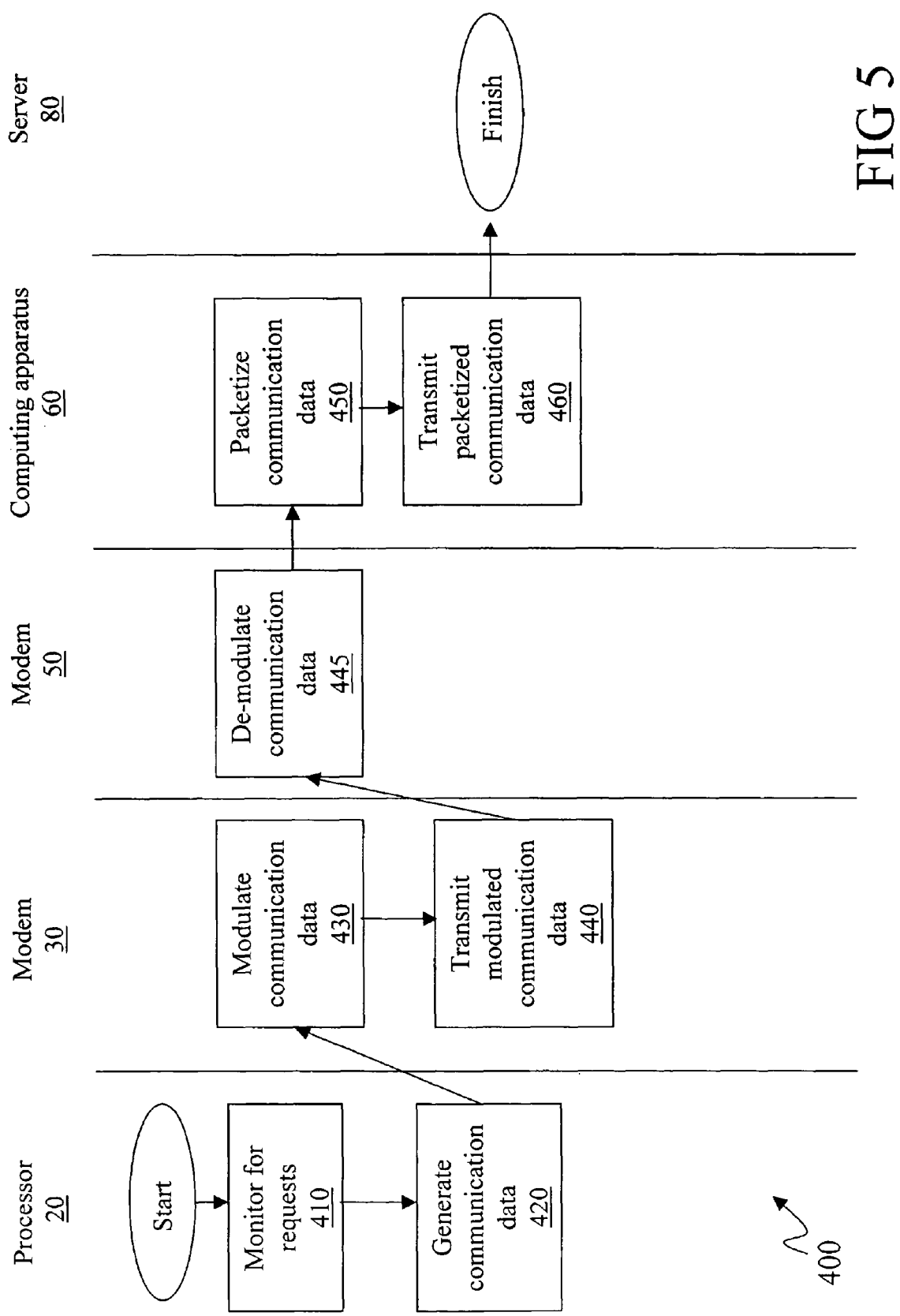
FIG. 5 is a flow chart illustrating a method for transmitting data over the packet-based connection within the system of FIG. 2 according to one embodiment of the present invention.

FIG. 5 depicts a method of transmitting data according to one embodiment of the present invention. In order to assist in the explanation of the method, it will be assumed that method 400 is operated using the system 100a of FIG. 2. Furthermore, the following discussion of method 400 will lead to further understanding of system 100a and its various components. It should be understood that the steps in method 400 need not be performed in the sequence shown. Further, it is to be understood that system 100a and/or method 400 can be varied, and need not work as discussed herein in conjunction with each other, and that such variations are within the scope of the present invention.

As depicted in step 410, the processor 20 monitors for requests that can be triggered either by the subscriber or automatically within programming of the processor 20. The type of requests entered by the user is not limited and can comprise a request for additional information on an interactive channel, a request for a game to be played on the video display apparatus 10 or request for submitting high scores. The type of requests triggered by programming of the processor 20 is not limited either and can comprise submission of previously entered votes, a request for new encryption codes, an authentication request for a smart card, a request for software download, a request for a firmware download, a request for an application download or the like. For example, the authentication request for a smart card can comprise verification of whether a proper smart card is inserted into a proper video display apparatus. Alternatively, the request can be generated by the programming of the processor 20 upon a certain event, such as the removal of a smart card from the video display apparatus 10 or the like. Furthermore, the request can be triggered by the server 80, for example by sending to the video display apparatus 10 a request to submit data representing program statistics, a random maintenance check, a forced software update, other management requests or the like. Upon receipt of a request, the method 400 proceeds to step 420. For illustration purposes only, it will be assumed that the user submits a request to send a high score from a game he/she just played to the server 80 for publication on a high score web site maintained by the server 80. There could be a fee associated with the submission of highest scores (for example, 25 cents).

In step 420, the processor 20 of the video display apparatus 10 generates communication data for transmission to the server 80. The communication data can comprise the request and a unique identifier associated with the video display apparatus 10. The unique identifier can comprise a subscriber account number, subscriber telephone number or video display apparatus identifier (for example, a MAC address). The communication data can comprise any other relevant information. In other embodiments of the present invention, the fee associated with the request is not transmitted as part of the communication data, but is rather stored in a database at the server 80. In some embodiments of the present invention, the communication data can further comprise information representing any fees associated with the service for which the request is submitted. In other embodiments, the fees may be pre-programmed at the server 80 or there may be no fee associated with the request.

In step 430 the processor 20 transmits the communication data to the modem 30 via the communication link 22. The modem 30 receives the communication data and modulates the communication data in a manner known to those skilled in the art. The protocols used for modulation are compatible with the communication link 35 and the modem 50.

In step 440 the modem 30 transmits the modulated communication data to the modem 50 via the communication link 35. In some embodiments of the present invention, the communication data can be sent to the modem 50 while bypassing the relaying apparatus 49 (depicted as A in FIG. 2A). In other embodiments, the communication data can be relayed through the relaying apparatus 49. The modem 50 receives the modulated communication data and demodulates the communication data in a manner known to those skilled in the art (depicted as step 445 on FIG. 4). The modem 50 transmits the demodulated communication data to the computing apparatus 60.

In step 450, the computing apparatus 60 receives the communication data and packetizes the communication data into one or more packets. Depending on the size of the communication data, it can be packetized in a single packet or in multiple packets. The computing apparatus 60 further adds the IP address, DN or URL associated with the server 80 either to the header or payload of the IP packet(s).

In step 460, the computing apparatus transmits IP packet(s) to the server 80. It will be recalled, that system 100a comprises the LAN 140 and the routing gateway 90 as depicted in FIG. 2. The routing of packet(s) between the translation apparatus 40 and the server 80 will be now explained in greater detail. The IP packet(s) sent by the translation apparatus 40 towards the server 80 are received at the routing gateway 90 and the server 80 as the destination is identified in a header portion or in the payload. The routing gateway 90 determines that the received packets should be sent to the server 80 over the packet-based network 70. However, because the LAN 140 is not visible to entities outside the LAN 140, the previously described NAT process is performed to ensure that return packets can be properly routed within the LAN 140 when received from the server 80.

It should be emphasized that the communications between the translation apparatus 40 and the server 80 can be a bi-directional real time communication connection. The server 80 can be generating the communication data and transmitting the communication data to the routing gateway 90 for subsequent transmission to the translation apparatus 40 via the LAN 140. In one specific non-limiting example, the server 80 can generate a confirmation of the received highest scores and transmit it to the video display apparatus 10 in the substantially reverse manner as described above.

In other embodiments, the connection between the processor 20 and the computing apparatus 60 can be maintained always-on or substantially always-on. In these embodiments, the server 80 can initiate communication with the processor 20. In these embodiments, the server 80 can maintain a table of IP addresses, DNs or URLs associated with the computing apparatuses 60 or the routing gateways 90. These embodiments are particularly useful for management and other functions that need to be performed by the server 80 from time to time. In these embodiments, the communication data can comprise software updates, requests for certain statistics, updated encryption keys, service authorization or the like.

Those skilled in the art will appreciate that in some embodiments, the functionality of the routing gateway 90, the translation apparatus 40 or the server 80 may be implemented as pre-programmed hardware, software, firmware elements or combination thereof.

Figure 6:
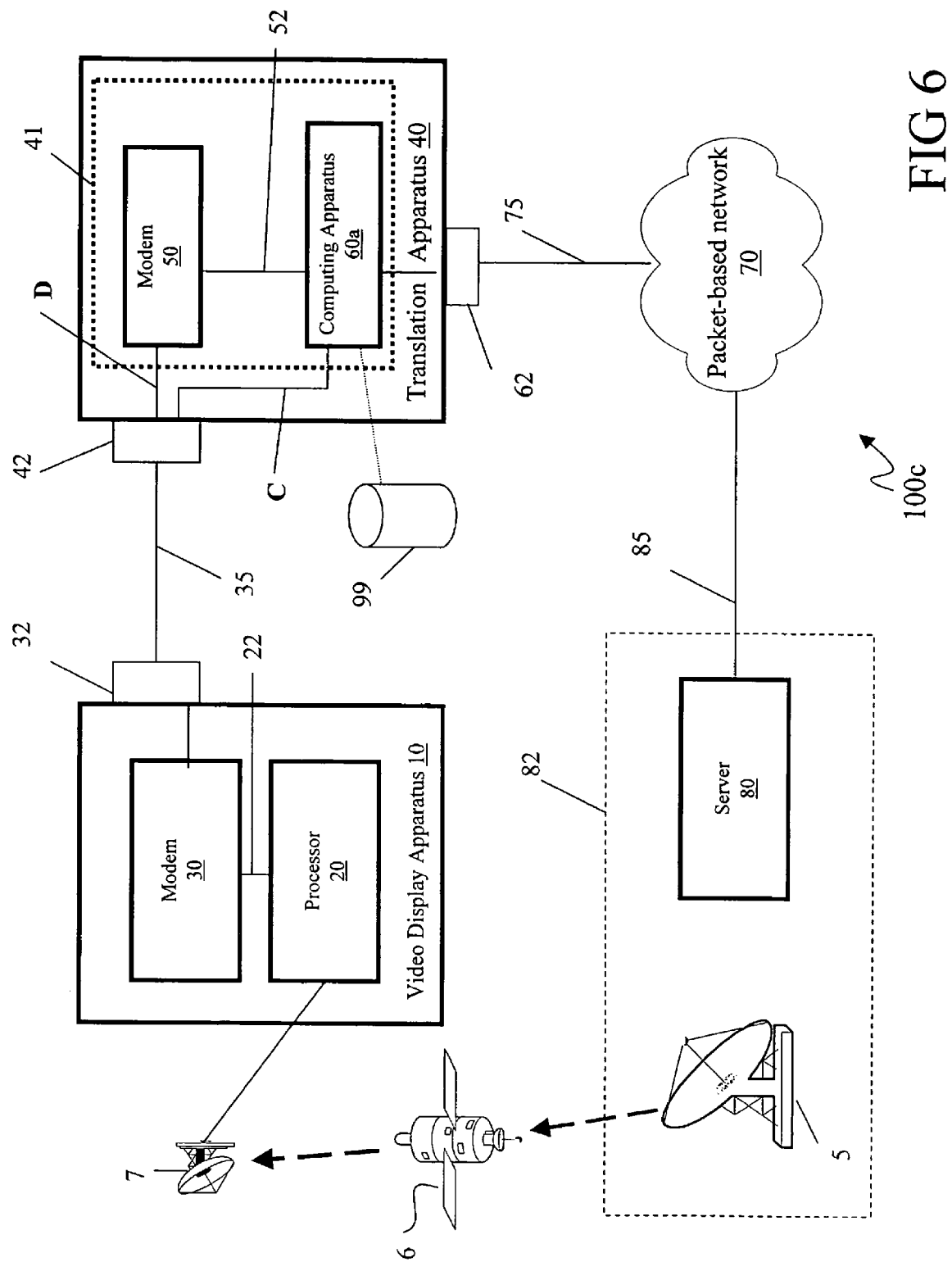
FIG. 6 is a block diagram illustrating a system for packet-based connection establishment according to another embodiment of the present invention.

FIG. 6 depicts system 100c that can be used to establish a packet-based connection according to another embodiment of the present invention. The system 100c comprises video display apparatus 10 and translation apparatus 40 similar to the system 100. In this embodiment, the translation apparatus 40 comprises a computing apparatus 60a that combines the functionality of the relaying apparatus 49 and the computing apparatus 60 of FIG. 1. The computing apparatus 60a provides the dial tone to the modem 30 over the communication link 35 (depicted as C). The computing apparatus 60a receives the call from the modem 30 and relays the call to the modem 50 by providing a ring tone. The modem 30 and modem 50 then establish a two way communication session as was explained in greater detail above (depicted as D). The computing apparatus 60 captures the connection number that was used to call the modem 50. The communication data is passed from the modem 30 to the computing apparatus 60a via the modem 50.

Figure 7:
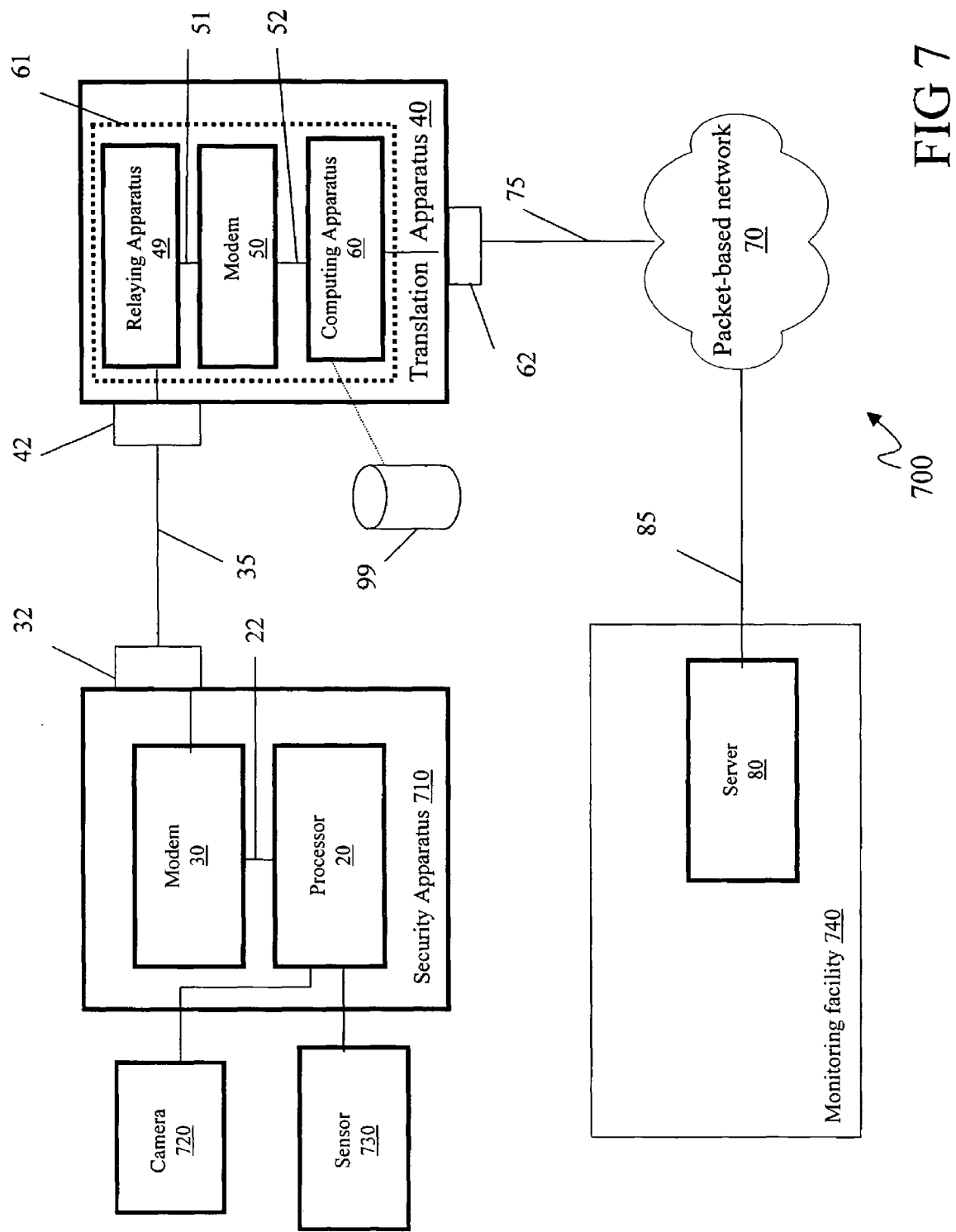
FIG. 7 depicts a block diagram illustrating a system for packet-based connection establishment according to another embodiment.

FIG. 7 depicts system 700 that can be used to establish a packet-based connection according to another embodiment. As depicted on FIG. 7, the translation apparatus 40 can be used to establish a packet-based connection with a security apparatus 710. The security apparatus 710 can be coupled to a camera 720 and a sensor 730. The sensor 730 can comprise a heat detector, a motion detector, a sound detector, a smoke detector or the like. One skilled in the art will appreciate that the security apparatus 710 can also be connected to an alarm device, AC power source, back-up power source and other monitoring devices, including further cameras, further sensors or the like. The security apparatus 710 can be used to determine security breaches, such as an intruder entering the monitored property, a motion within the monitored premises, occurrence of a fire or extreme heat within the monitored premises or the like. The security apparatus 710 can be located at a private property, such as an apartment, a house, a cottage or the like. Alternatively, the security apparatus 710 can be located at a commercial property, such as a store, a warehouse, a showroom or the like.

In some embodiments, the security apparatus 710 is connected to a monitoring facility 740. As can be appreciated by those of skill in the art, the monitoring facility 740 monitors breaches of security captured by the sensor 730 and the camera 720, and dispatches security or emergency personnel as the need may be. The two-way communication session between the security apparatus 710 and the translation apparatus 40 can be established upon power up of the security apparatus 710. Alternatively, the two-way communication session between the security apparatus 710 and the translation apparatus 40 can be established upon a particular event, such as a security breach captured by the camera 720 or the sensor 730. In some embodiments, the two-way communication session between the security apparatus 710 and the translation apparatus 40 can be maintained in an "always-on" or a substantially "always-on" manner. In other embodiments, the two-way communication session between the security apparatus 710 and the translation apparatus 40 can be disengaged upon completion of a certain task or upon expiration of a pre-determined time.

The monitoring facility 740 can comprise a server 80 coupled to the packet-based network 70. In these embodiments, the translation apparatus 40 enables establishment of the packet-based connection between a security apparatus 710 and the server 80 via the packet-based network 70. Furthermore, the translation apparatus 40 enables transmission of communication data between the security apparatus 710 and the server 80, such as a security breach information, monitoring data, a request for an authorization code update, a request for an authorization code reset, a request for a software download, a request for a firmware download and a request for an application download or the like. In some embodiments, monitoring data includes a video feed from the monitored property, a temperature reading, a security code or the like.

In some embodiments, the security breach occurs if the communication between the security apparatus 80 and the monitoring facility 740 is terminated. In these embodiments, the security apparatus 710 can initiate a sound alarm at the monitored premises.

Even though the foregoing description made reference to the server 80, one skilled in the art will appreciate that the present invention can equally apply to establishing a packet-based connection with any type of a remote computer. In further embodiments, the translation apparatus 40 could be utilized to establish a packet-based connection with other equipment that has a built-in dial up modem, such as telecommunication equipment (ex. switched, routers or the like) that may have a dial-up modem for management/security purposes. In these cases, the connection between the legacy modem and the translation apparatus 40 can be established upon power up of the equipment and can be maintained "always-on" or substantially "always-on". Alternatively, the connection can be triggered by a pre-determined event, such as a particular failure. In yet further embodiments, the translation apparatus 40 could be utilized to establish a packet-based connection with monitoring equipment, such as monitoring equipment used to monitor telecommunication network elements (ex. switches, routers or the like) that may have a dial-up modem for management/security purposes. In these cases, the connection between the legacy modem and the translation apparatus 40 can be established upon power up of the monitoring equipment and can be maintained "always-on" or substantially "always-on". Alternatively, it can be established upon a pre-determined event, such as power failure, network failure or the like.

Even though the communication session between the video display apparatus 10 and the translation apparatus 40 has been described as a two-way communication session, it should be understood that the communication session can be of a one-way type; thus providing only one way communication data flow between the video apparatus 10 and the server 80. For example, the communication data flow can be from the video display apparatus 10 to the server 80. Alternatively, the flow of communication data can be from the server 80 to the video display apparatus 10.

Therefore, according to the teachings of the present invention a system, apparatus and method for initiation of a packet-based connection with a dial up modem is provided. Furthermore, the present invention enables service providers to have one-to-one real time communication capabilities with the video display apparatuses, while allowing leveraging investments into existing networks and equipment.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A system for enabling the establishment of a packet-based connection with a remote computing apparatus, the system comprising:
a video display apparatus operable to generate a connection initiation request, the video display apparatus comprising a first modem;
a processing apparatus, coupled to the first modem and to a packet-based network, the processing apparatus having an interface adapted to be plugged directly into the video display apparatus; the processing apparatus comprising a second modem; the processing apparatus operable to receive the connection initiation request; responsive to the connection initiation request, the second modem operable to establish a modem-modem connection with the first modem of the video display apparatus; the processing apparatus further operable to receive at least one data signal from the video display apparatus via the modem-modem connection and to transmit the data signal to the remote computing apparatus via the packet-based network.

2. The system according to claim 1, wherein the processing apparatus is further operable to receive at least one data signal from the remote computing apparatus and to transmit the at least one data signal to the video display apparatus via the modem-modem connection.

3. The system according to claim 1, wherein the video display apparatus comprises a set-top box (STB) adapted for the use in a direct broadcast satellite system.

4. The system according to claim 1, wherein the connection initiation request is generated upon a power up of the video display apparatus.

5. The system according to claim 1, wherein the connection initiation request is generated upon loading of an Interactive TV application.

6. The system according to claim 1, wherein the connection initiation request is generated upon an occurrence of a pre-determined event.

7. The system according to claim 1, wherein the connection initiation request comprises at least one DTMF tone representing a connection number.

8. The system according to claim 7, wherein the processing apparatus is further operable to determine a network identifier associated with the remote computing apparatus based on the connection number.

9. The system according to claim 8 further comprising a look-up table for correlation of the connection number with the corresponding network identifier.

10. The system according to claim 1, wherein the at least one data signal comprises at least one of a microbilling event, a submission of a high score, a submission of a vote, a request for authorization for downloading of a pay-per-view movie, a request for a new encryption code, an authentication request for a smart card, a request for a software download, a request for a program download, a request for a firmware download, a random maintenance check request and submission of data representing program statistics.

11. A method for establishing a packet-based connection between a video display apparatus and a remote computing apparatus coupled to a packet-based network, the video display apparatus comprising a first modem, the method comprising:
a processing apparatus receiving a connection initiation request from the video display apparatus, the processing apparatus having an interface plugged directly into the video display apparatus;
a second modem in the processing apparatus establishing a modem-modem connection with the first modem within the video display apparatus responsive to the connection initiation request;
the processing apparatus receiving at least one data signal from one of (i) the video display apparatus via the modem-modem connection and (ii) the remote computing apparatus via the packet-based network; and
the processing apparatus transmitting the at least one data signal to the other one of (i) the video display apparatus via the modem-modem connection and (ii) the remote computing apparatus via the packet-based network.

12. The method according to claim 11, Wherein the receiving a connection initiation request comprises receiving at least one DTMF tone.

13. The method according to claim 11 further comprising providing a dial tone to the first modem prior to receiving the connection initiation request.

14. The method according to claim 11, wherein the receiving at least one data signal comprises receiving at least one of a microbilling event, a submission of a h score, a submission of a vote, a request for authorization for downloading of a pay-per-view movie, a request for a new encryption code, an authentication request for a smart card, a request for a software download, a request for a program download, a request for a firmware download, a random maintenance check request and submission of data representing program statistics.

15. The method according to claim 11 further comprising generating the connection initiation request prior to receiving the connection initiation request; wherein the generating is performed upon a power up of the video display apparatus.

16. The method according to claim 11 further comprising generating the connection initiation request prior to receiving the connection initiation request; wherein the generating is performed upon loading of an Interactive TV application.

17. The method according to claim 11 further comprising generating the connection initiation request prior to receiving the connection initiation request; wherein the generating is performed upon an occurrence of a pre-determined event.

18. An apparatus for enabling the establishment of a packet-based connection between a local computing apparatus and a remote computing apparatus coupled to a packet-based network, the local computing apparatus comprising a first modem, the apparatus comprising:
a first interface operable to be coupled to the first modem within the local computing apparatus;
a second interface operable to be coupled to the packet-based network;
a processing apparatus comprising a second modem, the processing apparatus operable to receive a connection initiation request from the local computing apparatus via the first interface and to establish a modem-modem connection with the local computing apparatus in response to the connection initiation request; the processing apparatus further operable to receive at least one data signal from the local computing apparatus via the modem-modem connection and to transmit the data signal to the remote computing apparatus via the packet-based network;
wherein the first interface is adapted to be plugged directly into the local computing apparatus.

19. The apparatus according to claim 18, wherein the local computing apparatus comprises a set-top box.

20. The apparatus according to claim 19, wherein the at least one data signal comprises at least one of a microbilling event, a submission of a high score, a submission of a vote, a request for authorization for downloading of a pay-per-view movie, a request for a new encryption code, an authentication request for a smart card; a request for a software download, a request for a program download, a request for a firmware download, a random maintenance check request and submission of data representing program statistics.

21. The apparatus according to claim 18, wherein the local computing apparatus comprises a security apparatus.

22. The apparatus according to claim 21, wherein the at least one data signal comprises at least one of a security breach information, a monitoring data, a request for an authorization code update, a request for an authorization code reset, a request for a software download, a request for a firmware download and a request for an application download.

23. The apparatus according to claim 18, wherein the local computing apparatus comprises a monitoring apparatus.

24. The apparatus according to claim 23, wherein the at least one data signal comprises at least one of a power failure information and a network failure information.

25. The apparatus according to claim 18, wherein the processing apparatus is further operable to receive at least one data signal from the remote computing apparatus and to transmit the at least one data signal via the modem-modem connection to the local computing apparatus.

26. The apparatus according to claim 18, wherein the connection initiation request comprises a connection number.

27. The apparatus according to claim 26, wherein the connection number comprises at least one DTMF tone.

28. The apparatus according to claim 27, wherein the processing apparatus is further operable to determine a network identifier associated with the remote computing apparatus based on the connection number.

29. The apparatus according to claim 26, wherein the processing apparatus is operable to access a look-up table to correlate the connection number and a corresponding network address.

30. The apparatus according to claim 18, wherein the processing apparatus comprises:
a relaying apparatus, coupled to the first interface, for enabling initiation of the modem-modem connection;
a network communication apparatus, coupled to the first interface, for establishing the modem-modem connection and demodulating the data signal, and
a computing apparatus, coupled to the network communication apparatus and the packet-based network, for packetizing the demodulated data signal.

31. The apparatus according to claim 30, wherein the relaying apparatus and the computing apparatus are embodied in a single apparatus.

32. The apparatus according to claim 30, wherein the relaying apparatus is operable to provide a ring tone to the network communication apparatus in response to the connection initiation request.

33. The apparatus according to claim 30, wherein the relaying apparatus is operable to provide a dial tone to the first modem via the first interface and, responsive to the connection initiation request, to provide a ring tone to the network communication apparatus.

34. A system for enabling the establishment of a packet-based connection with a remote computing apparatus, the system comprising:
a local computing apparatus operable to generate a connection initiation request, the local computing apparatus comprising a first modem;
a processing apparatus, coupled to the first modem and to a packet-based network, the processing apparatus having an interface adapted to be plugged directly into the local computing apparatus; the processing apparatus comprising a second modem; the processing apparatus operable to receive the connection initiation request; responsive to the connection initiation request, to establish a modem-modem connection with the local computing apparatus; the processing apparatus further operable to receive at least one data signal from the local computing apparatus via the modem-modem connection and to transmit the data signal to the remote computing apparatus via the packet-based network.

35. The system according to claim 34, wherein the processing apparatus is further operable to receive at least one data signal from the remote computing apparatus and to transmit the at least one data signal to local computing apparatus via the modem-modem connection.

36. The system according to claim 34, wherein the local computing apparatus comprises a security apparatus.

37. The system according to claim 36, wherein the connection initiation request is generated upon a power up of the security apparatus.

38. The system according to claim 36, wherein the connection initiation request is generated upon detection of a security breach by the security apparatus.

39. The system according to claim 36, wherein the at least one data signal comprises at least one of a security breach information, a monitoring data, a request for an authorization code update, a request for an authorization code reset, a request for a software download, a request for a firmware download and a request for an application download.

40. The system according to claim 34, wherein the local computing apparatus comprises a monitoring apparatus.

41. The system according to claim 40, wherein the connection initiation request is generated upon a power up of the monitoring apparatus.

42. The system according to claim 40, wherein the connection initiation request is generated upon a pre-determined event being detected by the monitoring apparatus.

43. The system according to claim 40, wherein the at least one data signal comprises at least one of a power failure information and a network failure information.

44. A method for establishing a packet-based connection between a local computing apparatus and a remote computing apparatus coupled to a packet-based network, the local computing apparatus comprising a first modem, the method comprising:
a processing apparatus receiving a connection initiation request from the local computing apparatus, the processing apparatus having an interface plugged directly into the local computing apparatus;
a second modem in the processing apparatus establishing a modem-modem connection with the first modem within the local computing apparatus responsive to the connection initiation request;
the processing apparatus receiving at least one data signal from one of the local computing apparatus via the modem-modem connection and the remote computing apparatus via the packet-based network; and
the processing apparatus transmitting the at least one data signal to the other one of the local computing apparatus via the modem-modem connection and the remote computing apparatus via the packet-based network.

45. The method according to claim 44, wherein the local computing apparatus comprises a security apparatus.

46. The method according to claim 45, wherein the receiving at least one data signal comprises receiving at least one of a security breach information, a monitoring data, a request for an authorization code update, a request for an authorization code reset, a request for a software download, a request for a firmware download and a request for an application download.

47. The method according to claim 45 further comprising generating the connection initiation request prior to receiving the connection initiation request; wherein the generating is performed upon a power up of the security apparatus.

48. The method according to claim 45 further comprising generating the connection initiation request prior to receiving the connection initiation request; wherein the generating is performed upon detection of a security breach by the security apparatus.

49. The method according to claim 44, wherein the local computing apparatus comprises a monitoring apparatus.

50. The method according to claim 49 further comprising generating the connection initiation request prior to receiving the connection initiation request; wherein the generating is performed upon a power up of the monitoring apparatus.

51. The method according to claim 49 further comprising generating the connection initiation request prior to receiving the connection initiation request; wherein the generating is performed upon occurrence of a predetermined event detected by the monitoring apparatus.

52. The method according to claim 49, wherein the receiving at least one data signal comprises receiving at least one of a power failure information and a network failure information.

* * * * *